July 12, 1955  L. HIMMEL  2,713,163
MULTILOBE OMNIRANGE BEACON SYSTEMS
Filed Dec. 14, 1951  2 Sheets-Sheet 1
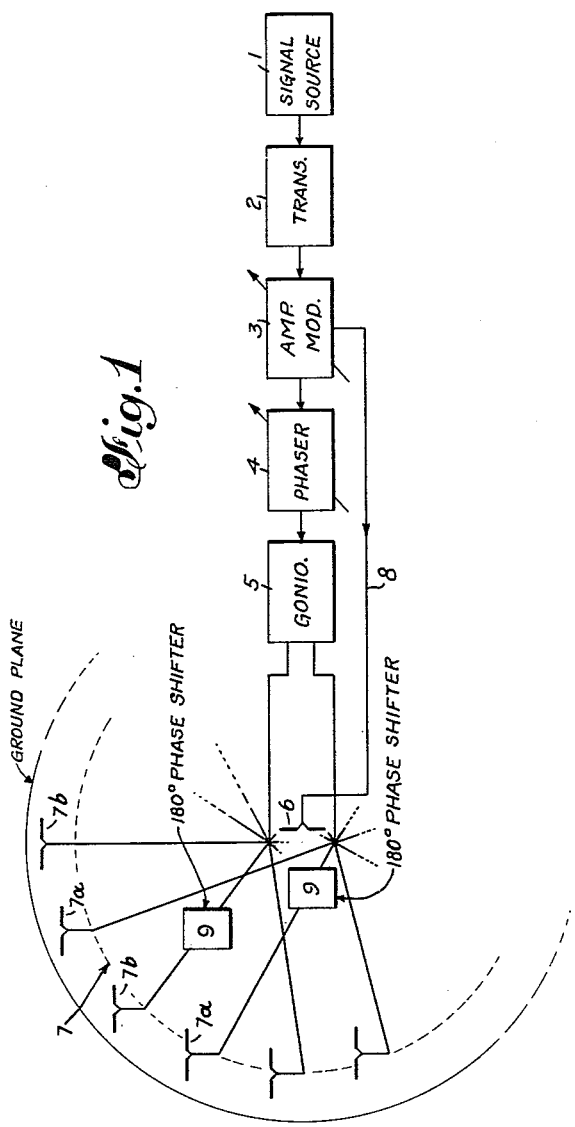
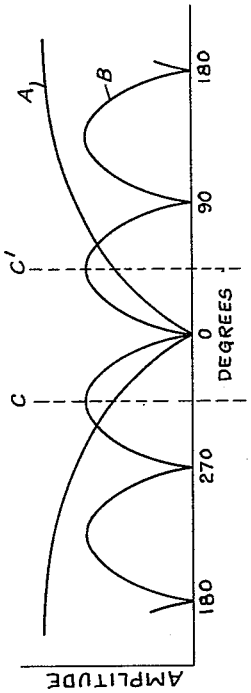
INVENTOR
LEON HIMMEL
BY
ATTORNEY July 12, 1955

L. HIMMEL 2,713,163

MULTILOBE OMNIRANGE BEACON SYSTEMS

Filed Dec. 14, 1951

INVENTOR
LEON HIMMEL
BY
ATTORNEY

2,713,163
MULTILOBE OMNIRANGE BEACON SYSTEMS

Leon Himmel, Cedar Grove, N. J., assignor to International Telephone and Telegraph Corporation, a corporation of Maryland Application December 14, 1951, Serial No. 261,638

13 Claims. (Cl. 343—106)

This invention relates to multilobe omnirange beacon systems and more particularly to means for rotating a multilobe radiation pattern goniometrically.

In omnirange beacon systems heretofore employed operating in the 100 mc. region and radiating essentially a rotating cardioid and a carrier on which is modulated a reference signal, considerable difficulty has been experienced with errors due to reflections of the radiated signal. It is well known that the use of harmonics in the radiation pattern will increase the "sharpness" of the null point of the radiation pattern and thus aid in minimizing these reflection errors. The radiation of harmonic patterns in omnirange beacons has in the past been accomplished only by utilizing unwieldy rotating antenna arrays many wavelengths in diameter or by complicated switching means using stationary arrays wherein the rotation is effected in steps.

One of the objects of this invention, therefore, is to provide an omnirange beacon system for effecting rotation of a harmonic radiation pattern without the use of rotating antennas or complicated switching means.

Another object is to provide goniometric rotation of a harmonic radiation pattern.

A further object is to provide an antenna system which rotates a strong harmonic radiation pattern without serious distortion and which is free from radio frequency phase shift as a function of azimuth angle.

Briefly, by this invention an R. F. energy source is coupled to the motor-driven rotor of a goniometer. A circular antenna array having a plurality of antennas alternately phased 0 and 180° is connected to one field winding of the goniometer. The second field winding of the goniometer, in quadrature relation to the first field winding, has coupled to it a second circular antenna array comprising a plurality of antennas also alternately phased 0 and 180°, the antennas thereof being interspersed with the antennas of the first array. An antenna situated in the center of the two arrays is coupled to the R. F. energy source and provides a nondirective R. F. carrier signal for the harmonic side band radiations. To provide for proper co-phasal relation between the carrier and harmonic signals, a variable phase adjuster is introduced between the goniometer and the source of R. F. energy. An amplitude adjuster divides the power output of the transmitter between the carrier antenna and the circular antenna arrays and thus provides the proper modulation relation between the carrier and harmonic signals.

One of the important features of this invention is the method of producing a desired multilobe radiation. In accordance with the principles of this invention, the goniometer output is sequentially fed to the harmonic array described above and to a concentric antenna array radiating a rotating cardioid pattern. Means are provided to distinctively modulate each radiation pattern. The central antenna provides a nondirective R. F. carrier signal modulated with a bearing reference signal. The receiver contains means to demodulate the received signals and to couple the demodulated signals to suitable phase comparison circuits where the phase difference of the bearing reference signals and the null point of the side band signals is determined. Means are provided for identifying the side band radiation pattern being transmitted. The multilobe harmonic side band signal is prevented from reaching the indicating means until the indication derived from the fundamental or cardioid side band radiation is within a predetermined indication range thus preventing ambiguities from arising due to the plurality of null points of the harmonic signal. Since the radiation pattern of the multilobe harmonic array will have greater "sharpness," the null point may be determined with greater accuracy thus making possible a more accurate measurement of the phase difference of the bearing reference signal and the null point of the side band radiation.

The above-mentioned and other features and objects of this invention and the manner of attaining them will become more apparent by reference to the following description taken in conjunction with the accompanying drawings, wherein:

Fig. 1 illustrates in block schematic form an embodiment of this invention for the rotation of a harmonic pattern;

Fig. 3 illustrates the radiation pattern of the omnirange beacon of this invention.

Figure 2:
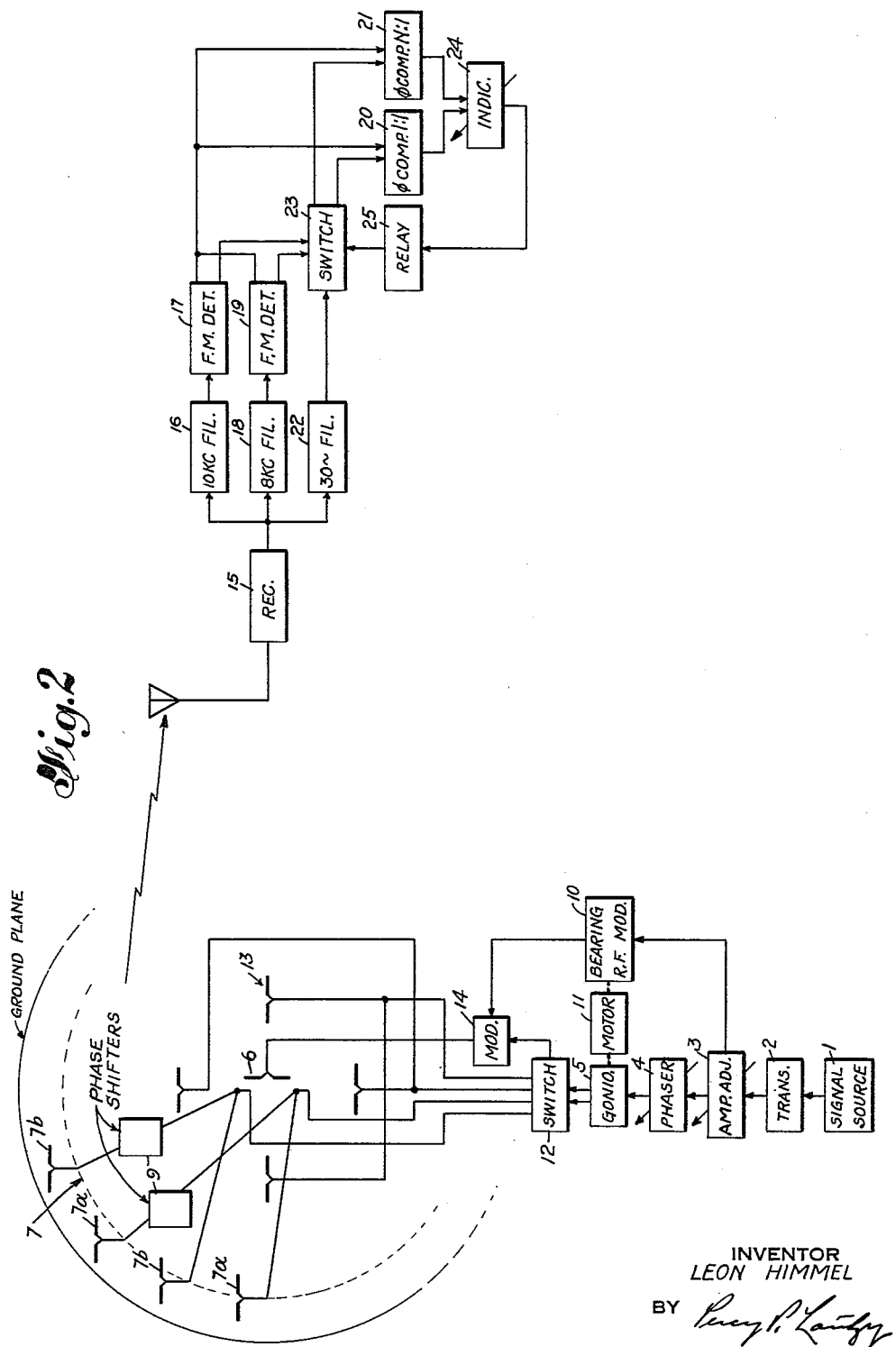
Fig. 2 illustrates an omnirange beacon system in accordance with the principles of this invention.

Referring to Fig. 1, an antenna system for rotating a multilobe radiation pattern goniometrically is shown comprising a signal source 1, a transmitter 2, an amplitude adjuster 3, a phaser 4, a goniometer 5, a center carrier antenna 6, and a circular antenna array 7 composed of two series of antennas 7a and 7b. The R. F. energy is coupled directly to the amplitude adjuster 3 which divides the R. F. energy between the center antenna 6 and the circular antenna array 7, thus adjusting the relative amplitude or per cent modulation of the radiation from the two antenna arrays 6 and 7. The center antenna 6 radiates a nondirectional R. F. carrier signal. The portion of the output of amplitude adjuster 3 coupled to the circular antenna array 7 is first fed to phaser 4 which adjusts the phase relation between the side band signal of the circular antenna array 7 and the R. F. carrier signal of the center antenna 6. The correctly phased and amplitude adjusted R. F. energy from the transmitter 2 is then fed to the motor-driven rotor of goniometer 5. One field winding of the goniometer 5 is coupled to antenna series 7a and the other field winding to antenna series 7b. Phase shifters 9 are provided to produce a 180° phase shift between alternate antennas of each series coupled to each field winding. It is to be clearly understood that the use of phase shifters 9 is for purposes of illustration only and any means known to those skilled in the art may be employed to produce a 180° phase shift between alternate antennas of each series.

To rotate a multilobe radiation pattern, the transmitter 2 supplies part of the R. F. energy to the carrier antenna 6 through the amplitude adjuster 3. This produces a nondirective carrier frequency pattern. The field windings of goniometer 5 supply side band currents to the antennas of the circular array 7. This produces a rotating field which rotates at the modulation frequency of the goniometer 5. Since alternate antennas of the circular array 7 are fed from the same field winding and the field windings of goniometer 5 are in quadrature relation, one series of antennas 7a will lead the other series of antennas 7b by 90°.

The R. F. energy in the central antenna 6 is adjusted, by means of phaser 4, to be in phase with the side band currents in the circular antenna array 7. The fields established by the energy fed to the circular array 7 are such that the net effect of the modulated fields is to establish a multilobe field which rotates about the center of the circular array 7 at the frequency of rotation of the goniometer rotor. When the center antenna 6 is energized by the R. F. energy from the transmitter 2, an R. F. field is established having a normally circular pattern which will combine with the multilobe pattern of the circular array 7, with which it is in phase, to establish a field having a multilobe pattern rotating about the central antenna 6 at a rotation frequency equal to the rotation of the goniometer rotor. Due to phase shifters 9 alternate antennas of each series are of opposite phase, thus one lobe of a multilobe radiation pattern will be radiated for every four antennas in the circular array 7. An amplitude adjuster 3 is provided for adjustment of the per cent modulation of the carrier by the side band currents. Any known amplitude adjuster may be used, one suitable type of amplitude adjuster that may be used being disclosed in my copending application, Serial No. 241,122, filed August 9, 1951, entitled "Amplitude Control Unit."

Referring to Fig. 2, a multilobe omnirange beacon system in accordance with the principles of this invention is shown comprising a signal source 1 and a transmitter 2 coupled to an amplitude adjuster 3. Part of the R. F. energy from the amplitude adjuster 3 is fed to a center carrier antenna 6. The radiation from the carrier antenna 6 is nondirectional and of constant phase throughout the 360° of azimuth. The carrier signal coupled to antenna 6 is first modulated by any well-known means to provide a bearing reference signal. The remaining R. F. energy from amplitude adjuster 3 is fed through phase adjuster 4 to the rotor of goniometer 5. The rotor of goniometer 5 is driven by motor 11 which is synchronously coupled to bearing reference modulator 10. Switch 12 alternately couples the output of the goniometer 5 field coils to the circular antenna array 7 and to the cardioid antenna array 13. Modulator 14, responsive to switch 12, varies the frequency of the subcarrier signal. Assume for purposes of this explanation that when the output of goniometer 5 field coils is coupled to the cardioid antenna array 13, the bearing reference signal modulates a 10 kc. subcarrier, and when the output of the goniometer 5 field coils is coupled to the circular antenna array 7, the bearing reference signal modulates an 8 kc. subcarrier thus providing means for the receiver to identify which antenna array is radiating side band signals. As the rotor of the goniometer 5 revolves, assume motor 11 drives the rotor at 30 c. p. s., the voltage fed to the cardioid array 13 varies sinusoidally at the rate of goniometer rotation and modulates the R. F. energy of the carrier antenna 6 to produce a rotating cardioid pattern as indicated in Fig. 3, curve A. The voltage fed to the circular antenna array from the field windings of goniometer 5 produces a rotating multilobe side band modulation of the R. F. carrier energy from antenna 6 as hereinbefore explained and as indicated in Fig. 3, curve B. The phaser 4 is adjusted to maintain the proper phasal relations between the R. F. carrier field and the rotating fields of antenna arrays 7 and 13. The amplitude adjuster 3 changes the per cent modulation of the carrier energy by the side band radiations. Thus the transmitted signal comprises an R. F. carrier signal, frequency modulated with a bearing reference signal alternately on an 8 kc. or 10 kc. subcarrier, respectively and alternately amplitude modulated by the side band radiations due to the circular antenna array 7 and antenna array 13 as indicated in Fig. 3.

The phase difference between the bearing reference signal and the null point of the cardioid radiation depends on the azimuth of the transmitter from the receiver. Hence by measuring this phase difference the bearing to the transmitter from the receiver may be determined.

The receiver section of this multilobe omnirange system, Fig. 2, comprises a receiver 15 to receive the transmitted signals. The bearing reference signal is filtered from the carrier by means of a 10 kc. filter 16 and an FM detector 17 or an 8 kc. filter 18 and FM detector 19. The detected bearing reference signal is coupled directly to the phase comparators 20 and 21. The cardioid and multilobe side band signals are passed by a filter 22 tuned to the frequency of the goniometer 5 rotation, 30 cycles per second. The filtered side band signals are coupled to switch 23. Switch 23, responsive to FM detectors 17 and 19, couples the output of the 30 cycle filter 22 due to the cardioid radiation from antenna array 13 to phase comparator 20 which is coupled to indicator 24 in a 1:1 ratio. Thus, a one degree phase difference between the bearing reference signal and the null point of the cardioid radiation as determined by phase comparator 20 will change the reading of indicator 24 one degree. The comparison of the cardioid radiation and the bearing reference signal is necessary to prevent ambiguities from arising from the comparison of the bearing reference signal and a null point of the multilobe radiation. The multilobe radiation will have a null point for each lobe or for each four antennas in the circular array 7. When the indicator 24 is within an indicating range which prevents ambiguities from arising, due to the plurality of null points of the multilobe radiation, as indicated by dotted lines c and c' of Fig. 3, the holding relay 25 activates switch 23 which then couples the output of the 30 cycle filter 22 to phase comparator 21 which is geared to indicator 24 in an N:1 ratio, N being the number of lobes radiated by the circular antenna array 7 which is proportional to the number of antennas in the array 7. Since the slope of the harmonic radiation as illustrated in Fig. 3 is sharper than that of the cardioid, the error of the indicator 24 can be reduced accordingly. In addition, it is well known that the error of the indication due to reflection of the transmitted signal will be reduced proportional to the order of harmonic radiated.

While I have described above the principles of my invention in connection with specific apparatus, it is to be clearly understood that this description is made by way of example only and not as a limitation to the scope of my invention as set forth in the objects thereof and in the accompanying claims.

I claim:

1. An antenna system for radiating a multilobe radiation pattern comprising a source of R. F. energy, a first series of at least four antennas arranged in a circle, a second series of at least four antennas interspersed with the antennas of said first series, means to couple the R. F. energy to said first series, means to couple the R. F. energy to the said second series of antennas in quadrature relation to the R. F. energy coupled to said first series of antennas, and means reversing the phase of the R. F. energy fed to alternate antennas of each of said series.

2. A radio beacon system for rotating a multilobe radiation pattern comprising a source of R. F. energy, a first series of at least four antennas arranged in a circle, a second series of at least four antennas interspersed with the antennas of said first series, means to couple the R. F. energy to said first series of antennas in phase sequence, means to couple the R. F. energy to the said second series of antennas in phase sequence in quadrature relation to the R. F. energy coupled to said first series of antennas, and means reversing the phase of the R. F. energy coupled to alternate antennas of each of said series.

3. A radio beacon system for rotating a multilobe radiation pattern comprising a source of R. F. energy, a goniometer having two field coils in quadrature relation and a rotor coil, means to rotate said goniometer rotor coil, means to couple said R. F. energy to said rotor coil, a first series of at least four antennas arranged in a circle, a second series of at least four antennas interspersed with the antennas of said first series, means to couple one said goniometer field coils to antennas of said first series, means to couple the second of said goniometer field coils to said second series of antennas, and means reversing the phase relation of alternate antennas of each of said series.

4. A beacon system for rotating a multilobe radiation pattern comprising a source of R. F. energy, a nondirectional antenna, means to couple said R. F. energy to said nondirectional antenna, a goniometer having two field coils in quadrature relation and a rotor coil, means to rotate said goniometer rotor coil, means to couple said R. F. energy to said rotor coil, a first series of at least four antennas arranged in a circle about said nondirectional antenna, a second series of at least four antennas interspersed with the antennas of said first series, means to couple one of said goniometer field coils to said first series of antennas, means to couple the second of said field coils to said second series of antennas, and means reversing the phase of alternate antennas of each of said series.

5. A beacon system according to claim 4, wherein said means to couple the R. F. energy to the said goniometer rotor coil further includes means to vary the phase of the said R. F. energy coupled to said rotor coil.

6. A beacon system according to claim 4, wherein said means to couple the R. F. energy to the said goniometer rotor coil and said means to couple the R. F. energy to said nondirectional antenna further includes means to adjust the relative amplitude of said R. F. energy coupled to said goniometer rotor and to said nondirectional antenna.

7. In an omnirange beacon having a source of R. F. energy coupled to a carrier antenna and to a goniometer, and antenna means coupled to field coils of said goniometer, to radiate a rotating cardioid pattern; a first series of at least four antennas arranged in a circle, a second series of at least four antennas interspersed with the antennas of said first series, means to couple said first series to one of said goniometer field coils, means to couple said second series to second of said goniometer field coils, means reversing the phase of alternate antennas of each series, and means to alternately feed the goniometer output to said antenna means to radiate a cardioid pattern and to said first and second series of antennas to radiate a multilobe pattern.

8. An omnirange beacon according to claim 7, wherein said means to couple the source of R. F. energy to said carrier antenna further includes means to modulate the R. F. energy according to which antennas said output is coupled.

9. A multilobe omnirange beacon system comprising a source of R. F. energy, means to modulate said R. F. energy with a bearing reference signal, a nondirective antenna, means to couple said nondirective antenna to said source of modulated R. F. energy, a goniometer having a rotor and two field coils in quadrature relation, means to rotate said rotor, antenna means associated with said nondirective antenna coupled to said field coils of the goniometer to produce a rotating cardioid radiation pattern, a first series of antennas arranged in a circle about said associate antenna means, means to couple said series of antennas to one of said goniometer field coils, a second series of antennas interspersed between antennas of the said first series, means to couple said second series of antennas to the said second field coil of said goniometer, means reversing the phase of alternate antennas of each series, means to alternately interrupt the coupling of said associate antenna means and said series of antennas to said goniometer field coils, means to modulate the energy radiated from said nondirective antenna and according to which antennas said output is coupled, a receiver to receive the transmitted signals, means to demodulate the bearing reference signal, means to filter out the signals due to the associate antenna means, means to filter out the signals due to said first and second series of antennas, a plurality of phase comparator means, means to couple the said bearing reference signal to said phase comparator means, means to couple the signal due to the associate antenna means to one of said phase comparators, indicator means to indicate results of said phase comparison operation, means responsive to said indicator to couple the signal due to said first and second series of antennas to the second phase comparator, and means to indicate results of said second phase comparison operation.

10. A multilobe omnirange beacon transmitting system comprising a source of R. F. energy, means to modulate said R. F. energy with a bearing reference signal, a nondirective antenna, means to couple said nondirective antenna to said source of modulated R. F. energy, a goniometer having a rotor and two field windings in quadrature relation, means to couple said goniometer rotor to said source of R. F. energy, means to rotate said rotor, antenna means associated with said nondirective antenna, means to couple said antenna means to said field coils of said goniometer to produce a rotating cardioid pattern, a plurality of antennas alternately of opposite phase in a first circular array about said cardioid array, means to couple said circular antenna array to one of said goniometer field coils, a second circular antenna array having a plurality of antennas alternately of opposite phase interspersed between antennas of said first circular antenna array, means to couple said second circular array to a second field coil of said goniometer, switching means to sequentially interrupt the coupling of said antenna means and said circular antenna arrays to said field coils of the goniometer, and modulator means to modulate said radiated energy in accordance with the position of said switching means.

11. A multilobe omnirange beacon transmitting system according to claim 10, wherein said means to couple said source of R. F. energy to said goniometer rotor and to said nondirective antenna further includes means to adjust the relative amplitude of the said R. F. energy coupled to said rotor coil and to said nondirective antenna.

12. A multilobe omnirange beacon transmitting system according to claim 10, wherein said means to couple said goniometer rotor to said source of R. F. energy further includes means to vary the phase of said R. F. energy coupled to said goniometer rotor.

13. A receiver to receive an omnirange radio signal which includes an R. F. carrier modulated with a bearing reference signal and alternately a rotating cardioid radiation pattern and a rotating multilobe radiation pattern, comprising a receiver to receive the transmitted signals, means to demodulate the bearing reference signal, means to filter out the bearing reference signals, means to filter out the cardioid and multilobe signals, a plurality of phase comparator means, means to couple the said bearing reference signal to said phase comparator means, means to couple the bearing reference signals to one of said phase comparators, indicator means to indicate results of said phase comparison operation, means responsive to said indicator to couple the cardioid and multilobe signals to the second phase comparator, and means to indicate results of said second phase comparison operation.

References Cited in the file of this patent

UNITED STATES PATENTS

| 1,379,541 | Murray | May 24, 1921 |
| 2,252,699 | Byrne | Aug. 19, 1941 |
| 2,422,110 | Luck | June 10, 1947 |
| 2,511,030 | Woodward | June 13, 1950 |